United States Patent [19]

Inabata

[11] Patent Number: 5,034,764
[45] Date of Patent: Jul. 23, 1991

[54] COMBINED EYE- AND WAIST-LEVEL REAL IMAGE MODE FINDER

[75] Inventor: Tatsuo Inabata, Kunitachi, Japan

[73] Assignee: Olympus Optical Co., Ltd., Tokyo, Japan

[21] Appl. No.: 489,557

[22] Filed: Mar. 7, 1990

[30] Foreign Application Priority Data

Mar. 8, 1989 [JP] Japan .................................. 1-55293

[51] Int. Cl.⁵ .............................................. G03B 13/02
[52] U.S. Cl. .................................................. 354/223
[58] Field of Search ....................... 354/223, 224, 225

[56] References Cited

U.S. PATENT DOCUMENTS 3,651,735 3/1972 Hiruma .............................. 354/223
3,788,202 1/1974 Wiessner ........................ 354/223 X
4,947,198 8/1990 Inanobe et al. ..................... 354/225

FOREIGN PATENT DOCUMENTS 61-156018 7/1986 Japan .
5911089 3/1987 Japan .
63-262635 10/1988 Japan .

Primary Examiner—L. T. Hix
Assistant Examiner—Howard B. Blankenship
Attorney, Agent, or Firm—Cushman, Darby & Cushman

[57] ABSTRACT

A combined eye- and waist-level real image mode finder is equipped with an objective lens, a first eyepiece, a second eyepiece arranged so that an optical axis is inclined at a predetermined angle with respect to the first eyepiece, and a light beam splitting device disposed between the objective lens and the first and second eyepieces and splitting a light beam coming from the objective lens so that one part of the light beam is incident on the first eyepiece and the other part is incident on the second eyepiece. This finder has therefore important advantages in practical use that even in a status devoid of space to place an eye at an eye point and a case of sudden shutter chance, the field of the picture to be photographed is viewed with a favorable visual field factor, imaging performance and diopter, an image is bright, a twin image is not produced, a field mask is easily set, size is compact, the number of parts is small even in the case of being used as a zoom finder, and parallax is not generated.

39 Claims, 10 Drawing Sheets

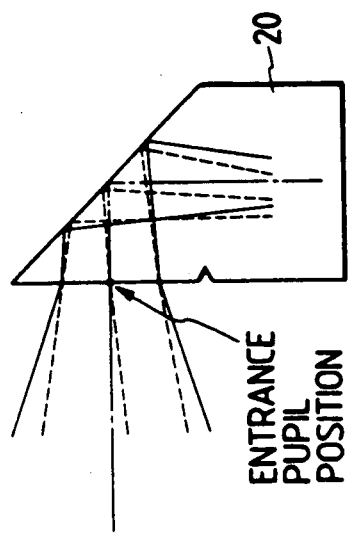
FIG. 18
FIG. 16
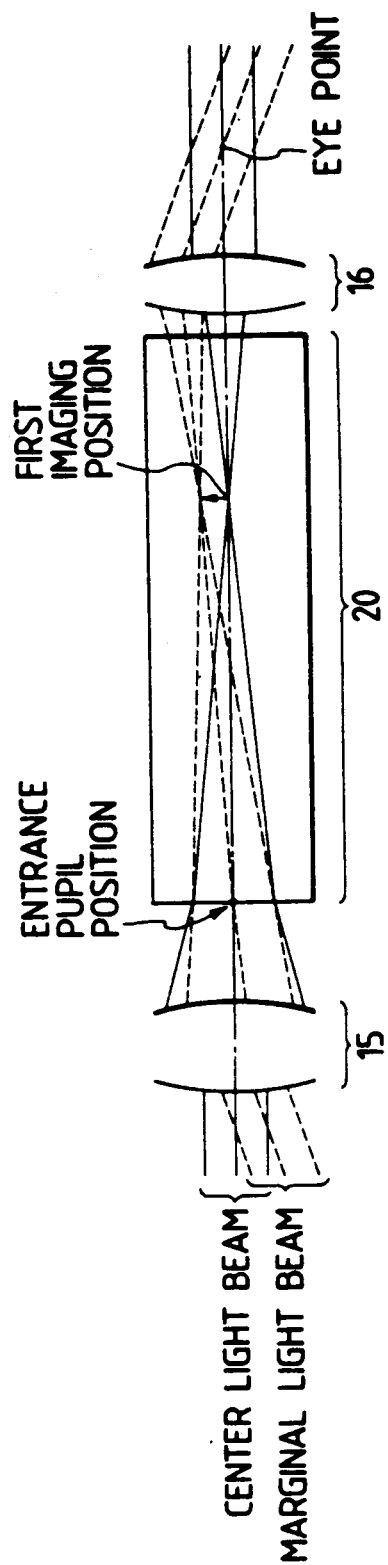
FIG. 17

COMBINED EYE- AND WAIST-LEVEL REAL IMAGE MODE FINDER

BACKGROUND OF THE INVENTION a) Field of the invention

This invention relates to a combined eye- and waist-level real image mode finder suitable for zooming compact cameras.

b) Description of the prior art

In general, a real image mode finder for compact cameras, as represented by an optical system set forth in Japanese Patent Preliminary Publication No. Sho 61-156018 and as shown in FIG. 1, comprises an objective lens system 1 adapted to form an image for once, an eyepiece system 2 adapted to magnify the image, and an image erecting prism 3 arranged between the systems 1 and 2 so that an eye is placed at an eye point set in a position separated by about 10-20 mm from the exit portion of the eyepiece 2 to view a virtual image, thereby confirming a visual field for photographing.

It is necessary for this finder, however, to place the pupil of the eye within a range of about 2-5 mm in diameter at the eye point set in the position located rearward by about 10-20 mm on an optical axis from the eyepiece in order to view the field of a picture to be photographed with a favorable visual field factor, imaging performance, and diopter. Consequently, under a status devoid of space to place the eye at the eye point and in a case where sudden shutter chance pressed for time has been given, it is impossible to view the field of the picture to be photographed with a favorable visual field factor, imaging performance, and diopter.

Therefore, in order to eliminate such a defect, a combined eye- and waist-level finder has been proposed and, for example, the finder described in Japanese Patent Publication No. Sho 59-11089, as depicted in FIG. 2, is composed of an objective lens 4, a half mirror 5, a reflecting mirror 6, an eye-level eyepiece 7, and a waist-level eyepiece 8. Further, the finder set forth in Japanese Patent Preliminary Publication No. Sho 63-262635, as shown in FIG. 3, is constructed of an eye-level objective lens 9, a waist-level objective lens 10, a Dach prism 11, an eye-level eyepiece 12, and a waist-level field lens 13.

In the finder of Sho 59-11089 described above, however, since light of a waist-level image is such as to be reflected once downward from the half mirror 5 and further reflected from the reflecting mirror 6 toward the waist-level eyepiece 8 with the result that it is involved twice in the half mirror 5 and also reflected by the reflecting mirror 6, the waist-level image will become very dark in practical use. Further, this finder has a disadvantage that the half mirror 5 is configured as a plane-parallel plate and as such a twin image is produced by reflected light of both sides of the plate. In addition, the finder has another disadvantage that since it is an albada type finder in which a real image is not formed, the diopter of a field image is difficult to coincide with that of a field mask, namely, the field mask is difficult to be set.

Also, the finder of Sho 63-262635 comprises an optical system in which a ray of light entering from the waist-level objective lens 10 is reflected from the Dach prism 11 and then formed as an image in the vicinity of the waist-level field lens 13 and an optical system in which a ray of light entering from the eye-level objective lens 9 traverses the Dach prism 11 to magnify the image by the eye-level eyepiece 12, and has a defect that since its entrance window is provided with separate objective lenses for the waist-level and the eye-level, space for the entrance window will increase. Further, the finder has another defect that, from the same reason, when it is used as a zoom finder, individual objective lenses need to be constructed as zoom lenses and the number of parts will increase. Also, it has a further defect that, from the same reason, parallax occurs between the eye-and waist-level systems.

SUMMARY OF THE INVENTION

The object of the present invention, in view of the above problems, is to provide a combined eye- and waist-level real image mode finder in which, even in a status devoid of space to place an eye at an eye point and a case of sudden shutter chance, the field of the picture to be photographed is viewed with a favorable visual field factor, imaging performance and diopter, an image is bright, a twin image is not produced, a field mask is easy to be set, size is compact, the number of parts is small even in the case of being used as a zoom finder, and parallax is not generated.

This object is achieved, according to the present invention, by the arrangement that in the combined eye- and waist-level real image mode finder in which a real image is formed once by an objective lens system and observed by an eyepiece system, an optical path splitting means for splitting light in directions of eye- and waist-level systems is provided on a given reflecting surface or transmitting surface of a prism such as a Porro prism or a mirror such as a Porro mirror for erecting an image, or an optical element having the same behavior which is arranged between the objective lens system and the eyepiece system. Whereby, the finder is constructed so that the light does not traverse plural times the same surface, and neither is the reflecting surface doubly viewed and so that the objective lens system profits from a single one.

The above means is divided into four types: (1) an optical path split at a totally reflecting surface, (2) an optical path split at an entrance surface, (3) an optical path split at an exit surface, and (4) a switchover split. Moreover, type (1) is classified into two: type A that a totally reflecting function is eliminated by cementing an independent prism and type B that the totally reflecting surface is discretely provided.

According to a preferred formation of the present invention, the optical path splitting means is constructed so that a light beam splitting element arranged between an objective lens system and eye- and waist-level eyepiece systems is configured by cementing a mirror surface of a triangular prism having a half mirror coated with a dielectric film or a metal film, or a pattern mirror coated with a metal film with high reflectance and adjusting the amounts of reflecting light and transmitting light in accordance with an area ratio of a reflecting portion to a transmitting portion, to a totally reflecting surface of a Porro prism. Otherwise, the half mirror or the pattern mirror may be provided instead of the totally reflecting surface of the Porro prism. In such a case, a Dach prism with the half mirror may also be provided instead of the triangular prism. Whereby, in each of the eye- and waist-level systems, the same erect image can be secured through the objective lens system used in common.

According to another preferred formation of the present invention, the optical path splitting means is constructed of the Porro prism having a totally reflecting portion directing the light toward the eye-level system while holding a totally reflecting angle and a transmitting portion conducting the light toward the waist-level system without keeping the totally reflecting angle.

According to still another preferred formation of the present invention, the optical path splitting means is comprised of the Porro prism reflecting part of a light beam from the reflecting surface coated with a high reflective film toward the waist-level system located above and transmitting the other part through its entrance surface toward the eye-level system and the Dach prism or a Dach mirror reflecting further the reflected light beam travelling in the direction of the waist-level system, toward the eye by its Dach reflecting surface.

According to a further preferred formation of the present invention, the optical path splitting means comprises the Porro prism provided with, on its exit surface, a plane surface portion rendering light rays emerging therefrom travel in straight lines toward the eye-level system and a Fresnel lens portion conducting upward the rays in the direction of the waist-level system. In this instance, the exit surface is provided adjacent to an exit pupil position, thereby enabling the field image of the total image height from the center to the periphery to be divided with virtually equal amounts of light toward the eye- and waist-level systems.

According to a still further formation of the present invention, the optical path splitting means is comprised of the Porro prism formed into two pieces by being cut with a plane surface normal to or substantially normal to the optical axis just before the position of its fourth reflecting surface so that in the case of being used as an eye-level finder, this cut portion is inserted into the optical path to direct rearward the light, while in the case of a waist-level finder, the cut portion is removed from the optical path to conduct upward the light.

This and other objects as well as the features and advantages of the present invention will be apparent from the following detailed description of the preferred embodiments when taken in conjunction with the accompanying drawings.

BRIEF DESCRIPTION OF THE DRAWINGS

FIG. 16 is a perspective view of a Dach mirror;
FIG. 17 is a schematic view of a fifth embodiment;
FIG. 18 is a view showing a configuration of a Porro prism of the fifth embodiment.

DESCRIPTION OF THE PREFERRED EMBODIMENTS

Figure 1:
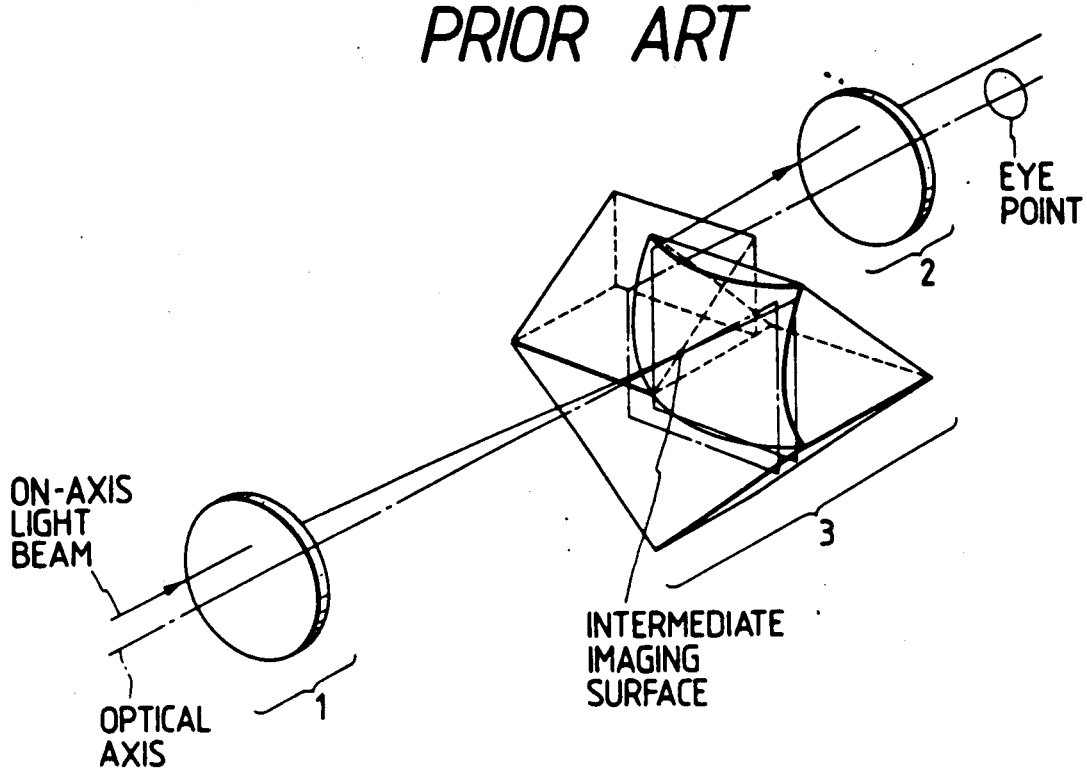
FIGS. 1 to 3 are perspective views of various conventional examples.
Figure 2:
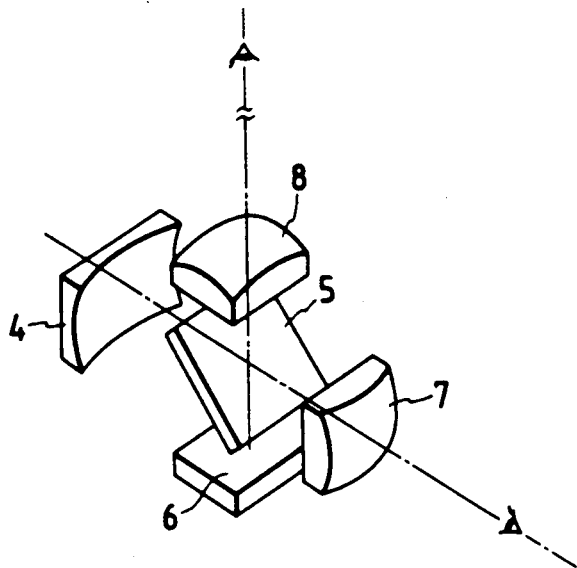
Figure 3:
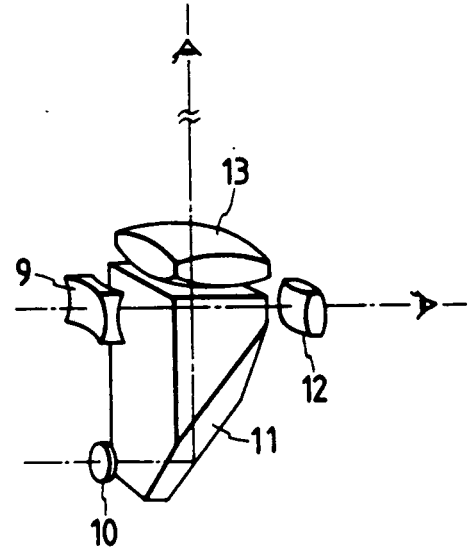

In accordance with the embodiments shown in the drawings, the present invention will be described in detail below.

Figure 4:
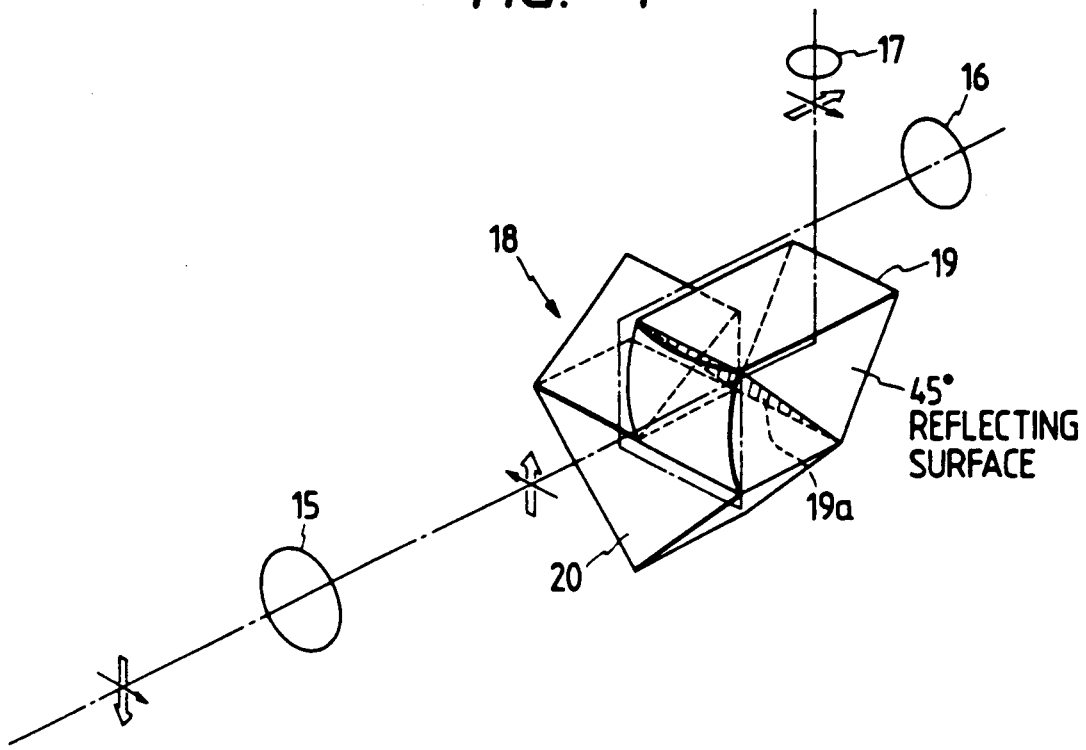
FIG. 4 is a perspective view of a first embodiment.

FIG. 4 shows a first embodiment, which is of type (1)-A and comprises a light beams splitting element 18 arranged between an objective lens system 15 and eye- and waist-level eyepiece systems 16, 17 which is configured by cementing a mirror surface 19a of a triangular prism 19 having a half mirror coated with a dielectric film such as $ZrO_2$, SiO, $SiO_2$, $TiO_2$, etc. or a metal film such as Al, Cr, etc. or a pattern mirror coated with a metal film, such as Al, Ag, etc., of reflectance as high as 80% or more and adjusting the amounts of reflecting light and transmitting light in accordance with an area ratio of a reflecting portion to a transmitting portion, to a given totally reflecting surface of a Porro prism 20. Otherwise, it comprises the half mirror or the pattern mirror provided on any surface of the Porro prism 20 to which the triangular prism is cemented.

This embodiment is constructed as in the foregoing and such a simple construction that a coating is applied to a surface of the triangular prism 19 or a surface of the Porro prism and the surface is cemented to a first reflecting surface of the Porro prism 20 renders it possible to split a light beam imaged through the same objective lens system in directions of the eye-level eyepiece system 16 and the waist-level eyepiece system 17 and make observation with both level systems. Further, in the embodiment, since light does not pass plural times through the same surface, an image is bright and since the reflecting surface is not doubly configured, neither is a twin image formed. Moreover, the embodiment adopts an intermediate imaging system, so that a field mask is easy to be set. Because it is necessary only to provide a single objective lens system in the embodiment, the number of parts remains small even if it is constructed as a zoom finder. From the same reason, space necessary for an entrance window is saved and therefore the compaction of a camera is possible. Further, from the same reason, variation in a zoom ratio is not produced between the eye- and waist-level systems and a driving means is simple. In addition, from the same reason, parallax will not occur between the eye- and waist-level systems.

Figure 5:
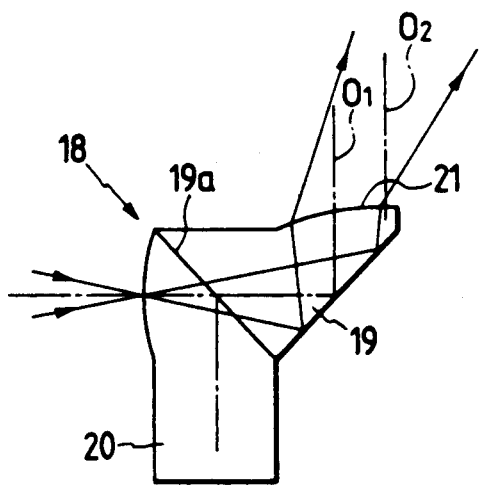
FIGS. 5 to 8 are views showing modified examples of a light beam splitting element of the first embodiment.
Figure 6:
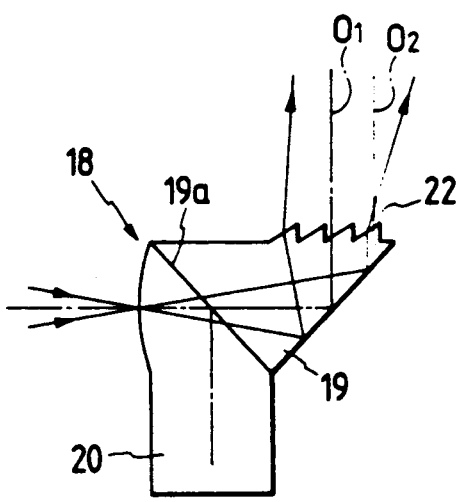
Figure 7:
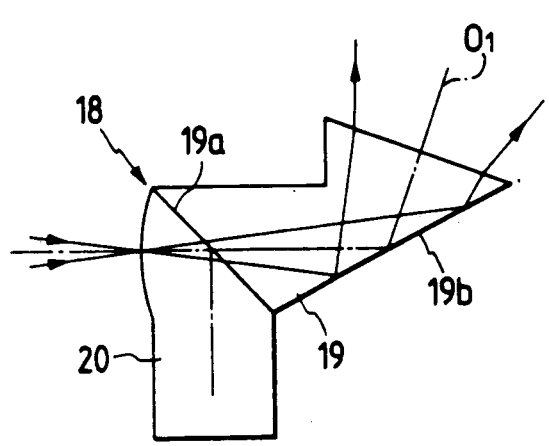
Figure 8:
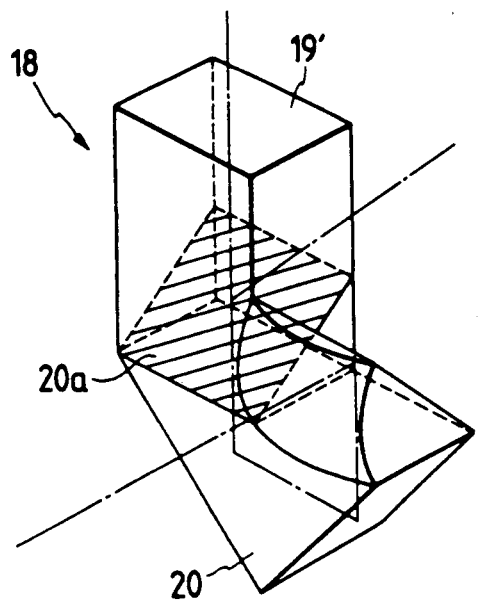

Here, considering the case where the embodiment is incorporated in a camera, it will be noted that a human eye is located on the opposite side of the objective lens system with respect to the optical element 18. It is therefore desirable that the light is conducted rearward of the optical element 18 rather than the case where the image is transmitted, directly upward, from the first reflecting surface (mirror surface 19a) of the optical element 18 through the triangular prism 19. Thus, as shown in FIG. 5 by way of example, the optical element 18 may be provided with a field lens 21 having an optical axis $O_2$ which is decentered from an optical axis $O_1$ of the prism toward the eye. Further, for example, as depicted in FIG. 6, the field lens 21 may also be replaced with a Fresnel lens 22. In such an instance, Fresnel pitches can arbitrarily be set and, in an extreme case, only one inclined plane may well be provided. Furthermore, for example, as shown in FIG. 7, the reflected light may also be directed toward the eye in such a manner that a reflecting surface 19b of the triangular prism 19 is not inclined at an angle of 45° in regard to an optical axis of incidence, but at a larger angle. Otherwise, individual modifications may also be combined with each other, thereby, for example, rendering the reflecting surface larger and configuring an exit portion as the Fresnel lens. Moreover, as depicted in FIG. 8, even in the case where the light travelling already upward is split at a fourth reflecting surface 20a to which an optical path splitting prism 19' is cemented, the same effect is brought about by setting a lens with a decentered optical axis onto an exit surface. Since, in this manner, other reflecting surfaces also have exactly the same effect, the explanation relative to the other reflecting surfaces will be omitted hereinafter.

Figure 9:
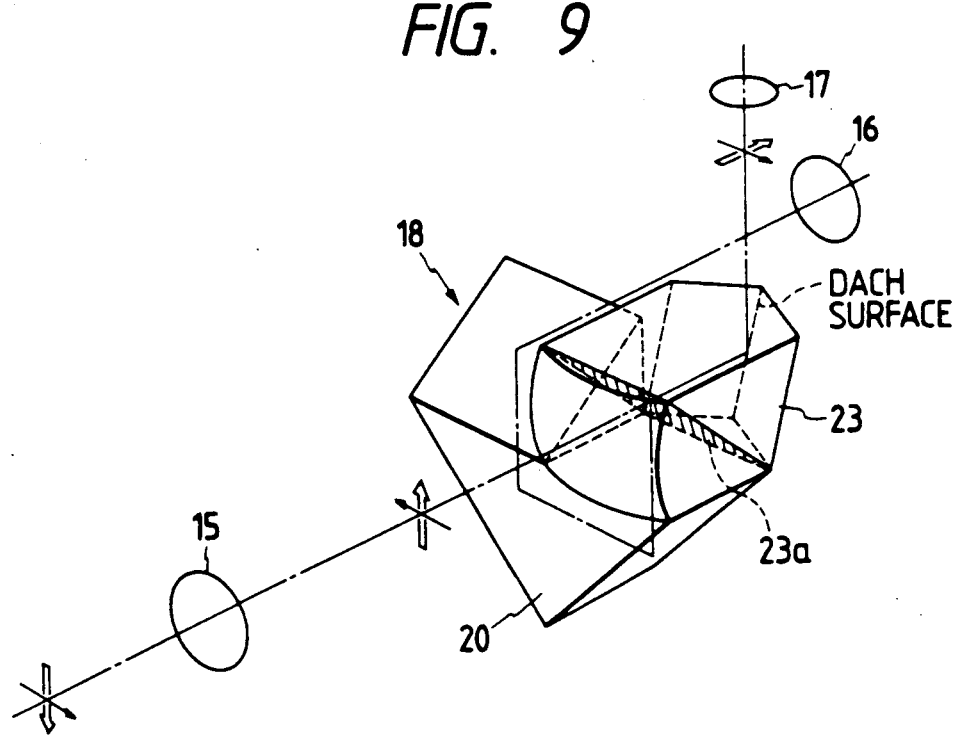
FIG. 9 is a perspective view of a second embodiment.

Also, in the first embodiment, because of the cementation of the triangular prism 19, an erect image is formed in the waist-level system whereas the image reverses laterally in the eye-level system, though vertically erected, with the result that images formed in the eye- and waist-level systems fail to coincide in orientation with each other and photographing in the eye-level system will become extremely unnatural. Therefore, like a second embodiment shown in FIG. 9, when a Dach prism 23 provided with a half mirror surface 23a is disposed in place of the triangular prism and cemented to the Porro prism 20, the same erect image is derived from the objective lens system 15 in both the eye- and waist-level systems and the above effect of the present invention can be attained by such a simple structure as in the first embodiment.

Figure 10:
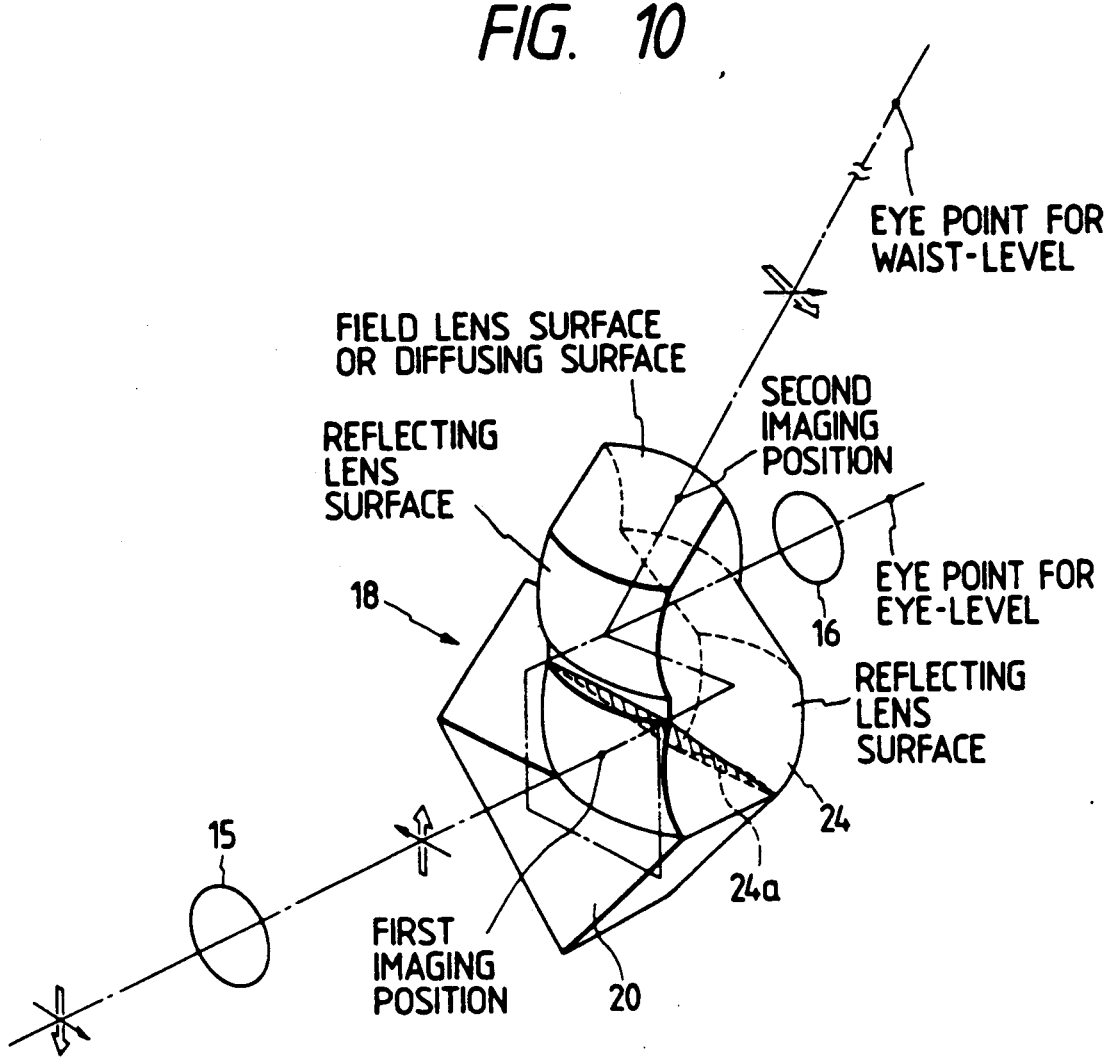
FIG. 10 is a perspective view of a third embodiment.
Figure 11A:
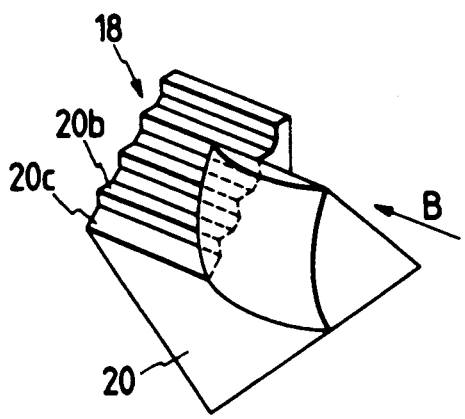
FIGS. 11A and 11B are a view showing a light beam splitting element of a fourth embodiment and a view seen from the direction of an arrow B of FIG. 11A, respectively.
Figure 11B:
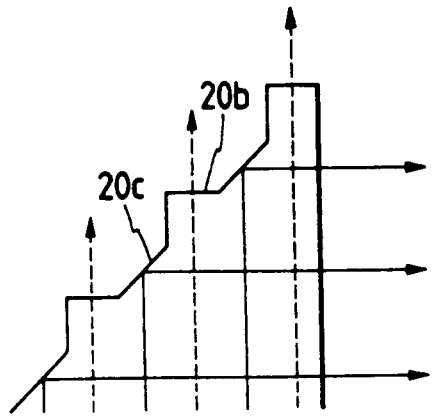

Like a third embodiment depicted in FIG. 10, even when a prism 24, provided with a half mirror surface 24a, including an imaging optical system is disposed instead of the triangular prism and cemented to the Porro prism 20 so that image formation is performed again after the light traverses the half mirror surface 24a, the erect image is attained. FIGS. 11A and 11B are a view showing a light beams splitting element of a fourth embodiment and a view seen from the direction of an arrow B of FIG. 11A, respectively. This embodiment is of type (1)-B, which is provided with a surface, instead of an ordinary 45° reflecting surface of the Porro prism 20, comprising a totally reflecting portion 20b conducting the light toward the eye-level system while holding a totally reflecting angle and a transmitting portion 20c conducting the light toward the waist-level system without keeping the totally reflecting angle. With respect to both the portions 20b and 20c, their area ratio is determined according to how large amounts of light are distributed toward individual level systems. If, however, light rays of angles of view required are guided to respective eye points, it is not always necessary to provide alternately the totally reflecting portion 20b and the transmitting portion 20c. Further, if the condition of the surface composed of the portions is such an extent that the distinctions cannot be visually made through the finder, pitches for the arrangement of the portions 20b and 20c may arbitrarily be selected.

Figure 12:
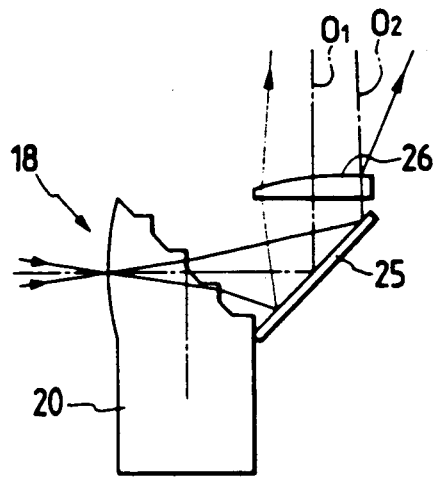
FIGS. 12 to 15 are views showing modified examples of the light beam splitting element of the fourth embodiment.
Figure 13:
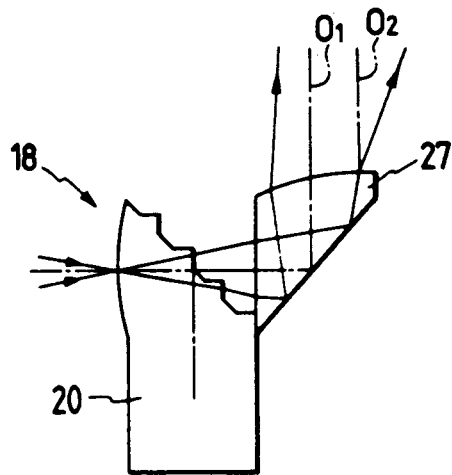
Figure 14:
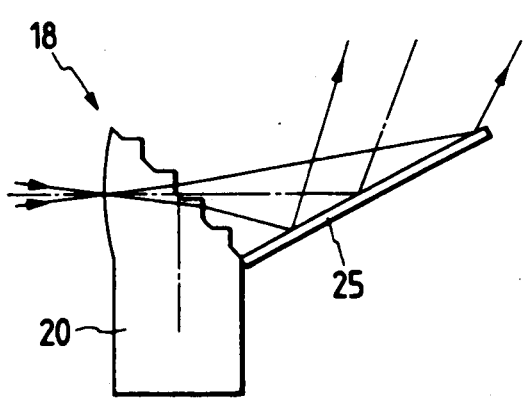
Figure 15:
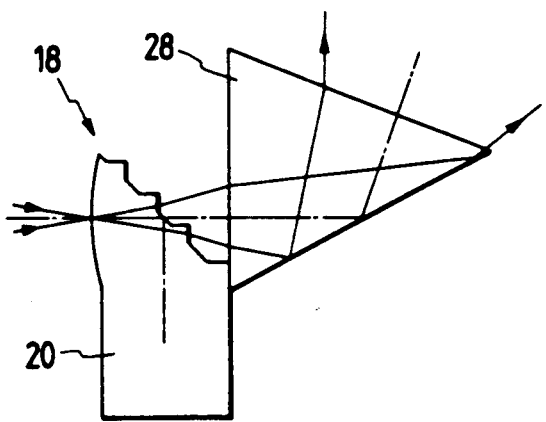

Even in this case, it is desirable to conduct the emerged light on the opposite side of the objective lens system 1 from the same reason as in type A, and for this purpose, as shown in FIG. 12 by way of example, a decentered field lens 26 may be disposed in the optical path bent by a mirror 25. Further, as shown in, for example, FIG. 13, an independent prism 27 combining integrally the mirror with the field lens may also be provided. These field lenses may well be configured as Fresnel lenses. In addition, as depicted in FIG. 14, the arrangement may be made in such a manner that the surface of the mirror 25 is not inclined at an angle of 45° with respect to the optical axis incident on the surface, but at a larger angle, to guide the reflected light toward the eye. Otherwise, as depicted in , for example, FIG. 15, an independent triangular prism 28 may also be used instead of the mirror 25. Moreover, individual modifications may also be combined with each other, thereby, for example, rendering the reflecting surface larger and configuring the exit portion as the Fresnel lens.

Here, turning attention to vertical and lateral orientation of the image as in the case of type A, it is desirable that the reflecting surface reflecting the light emerging from the Porro prism 20 is substituted by a Dach mirror or Dach prism for erecting laterally the image. The Dach mirror, which has such a configuration as is shown in FIG. 16, diminishes in uneven thickness and is good in formability compared with the Dach prism.

FIG. 17 is a schematic view of a fifth embodiment showing the Porro prism which is an image erecting optical system as a block. This embodiment is of type (2) and in order to divide a field image of the total image height from the center to the periphery which is required to make observation through the finder with virtually equal amounts of light at the entrance surface of the prism toward the eye- and waist-level systems, it is necessary to set an entrance pupil position or a pupil imaging position equivalent thereto at the entrance surface or in the vicinity thereof and as such, unlike other types, the embodiment is constructed so that an intermediate imaging position is not set in the vicinity of the entrance surface. A practical configuration of the Porro prism 20 is as diagrammed in FIG. 18.

Figure 19:
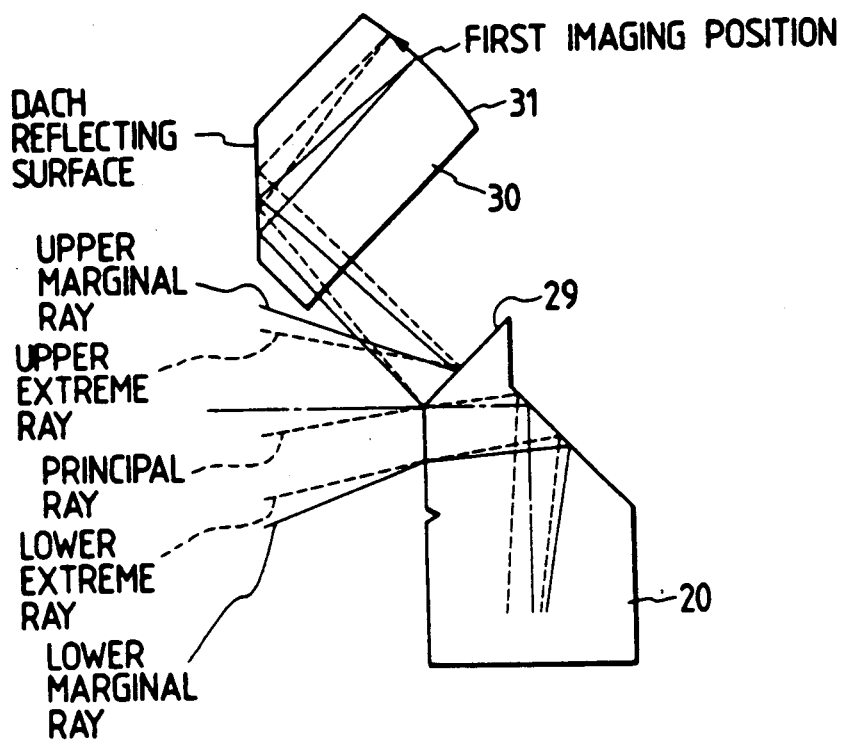
FIG. 19 is a view showing an example of optical path splitting processes in the fifth embodiment.

In FIG. 19 is shown an example of optical path splitting processes. An on-axis light beam ranging from the optical axis to an upper marginal ray and a peripheral light beam ranging from a principal ray to an upper extreme ray, namely, a light beam passing through the upper portion of the pupil are upwards reflected from a reflecting surface 29 coated with a high reflective film, such as Al or the like, provided on the entrance surface toward the waist-level system. Further, an on-axis light beam ranging from the optical axis to a lower marginal ray and a peripheral light beam ranging from the principal ray to a lower extreme ray, namely, a light beam traversing the lower portion of the pupil transmits the entrance surface and travels in the direction of the eye-level system. The light beam reflected toward the waist-level system is then reflected in the direction of the eye located on the opposite side of the prism 20 in respect of the objective lens system 15 by a Dach prism 30 having a Dach reflecting surface. Also, the Dach prism 30 may be replaced with the Dach mirror.

Further, a first imaging position of the waist-level system is available at a place equivalent in optical path length to a first imaging position of the eye-level system located inside the prism 20. A field lens 31 or a diffusing surface is provided at this place, thereby allowing the eye point to be separated from a camera body. Otherwise, like type (1), the field lens 31 may also be constructed as the Fresnel lens. If the orientation of the image allows of lateral reverse, an ordinary reflecting surface may also be used instead of the Dach reflecting surface.

Figure 20:
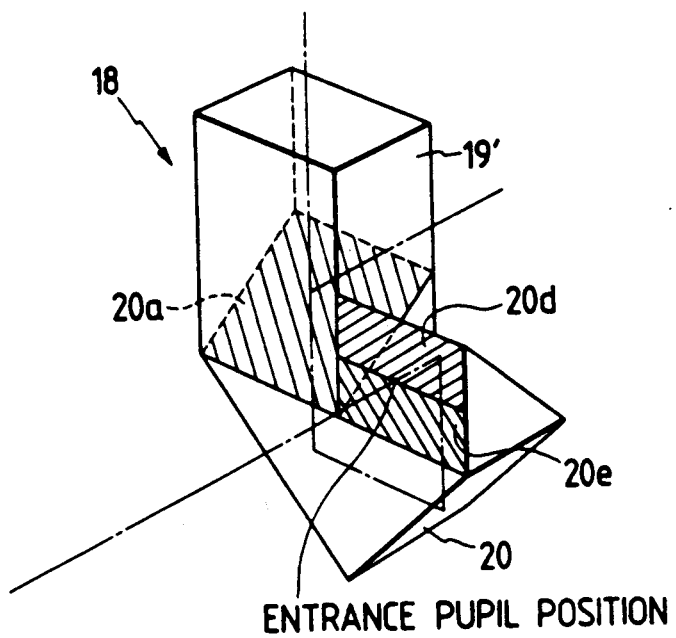
FIG. 20 is a perspective view of an optical path splitting member of a sixth embodiment.
Figure 21A:
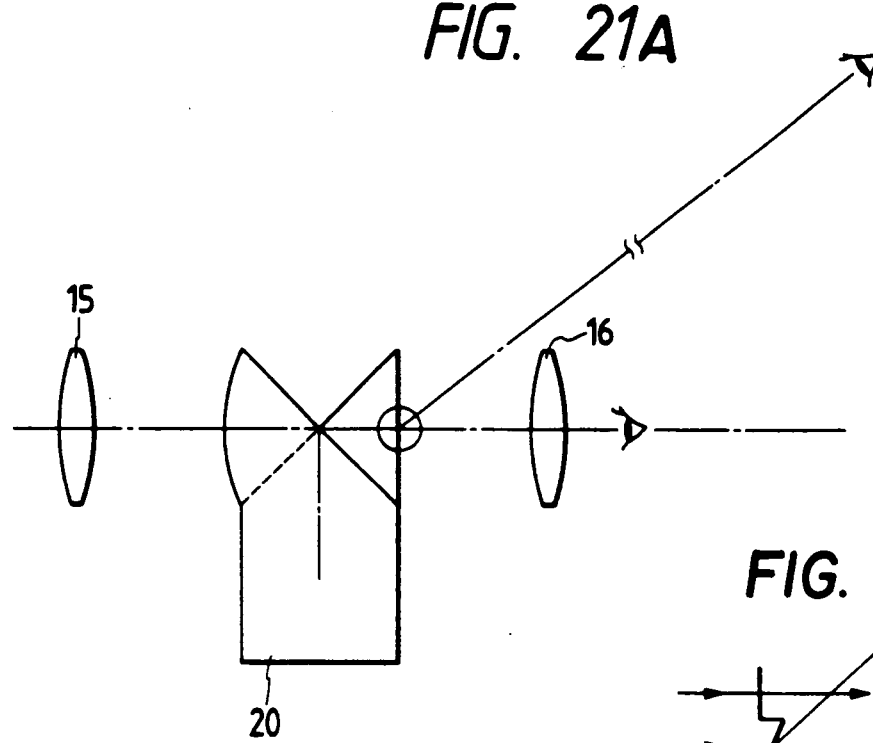
FIG. 21 is a schematic view of a seventh embodiment.
Figure 21B:
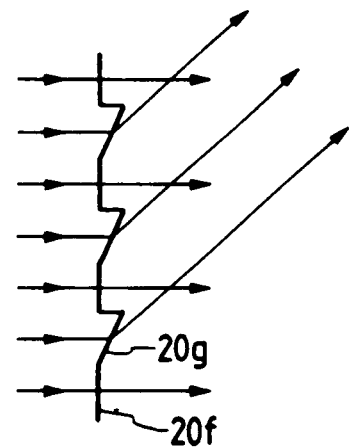

FIG. 20 shows an optical path splitting member of a sixth embodiment, which comprises the optical path splitting means of type (1) combined with that of type (2). First, on the entrance surface of the Porro prism lying at the entrance pupil position of the optical path splitting member 18, at a position conjugate therewith, or at a position located in the vicinity of these positions are provided a filter section 20d pervious to only P polarized light, among random polarized light, in an area corresponding to the upper side of the pupil and a filter section 20e pervious to only S polarized light in an area corresponding to the lower side of the pupil. Then, the optical path splitting prism 19' applying a coating for transmitting the P polarized light and reflecting the S polarized light is cemented to the given reflecting surface 20a closer to the eyepiece than the entrance surface of the Porro prism 20 so that the light beam is split in the directions of the eye- and waist-level systems. Contrary to this, the prism 19' may also be such that the P polarized light is reflected and the S polarized light is transmitted. An arbitrary selection can be made as to which side of the pupil should accommodate S polarized light reflection or P polarized light reflection. Also, the arrangement after the split of the light is the same as in type (1). type (3) and provided with a plane surface portion 20f rendering emerged rays travel in straight lines toward the eye-level system and a lens or Fresnel lens portion 20g directing upward the rays toward the waist-level system on the exit surface of the Porro prism 20. In such a case, like type (2), in order to divide the field image of the total image height from the center to the periphery with virtually equal amounts of light toward the eye- and waist-level systems, it is necessary to set the entrance pupil position where light beams of individual image heights are almost mixed or the pupil imaging position equivalent thereto at the exit surface or in the vicinity thereof. In this embodiment, the exit surface is placed adjacent to an exit pupil position (eye point).

Figure 22:
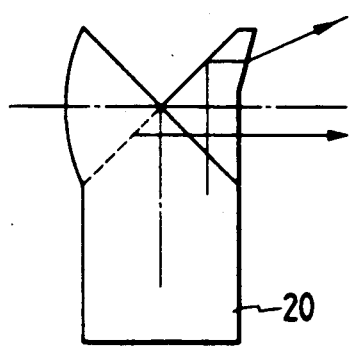
FIG. 22 is a view showing a modified example of a Porro prism of the seventh embodiment.
Figure 23:
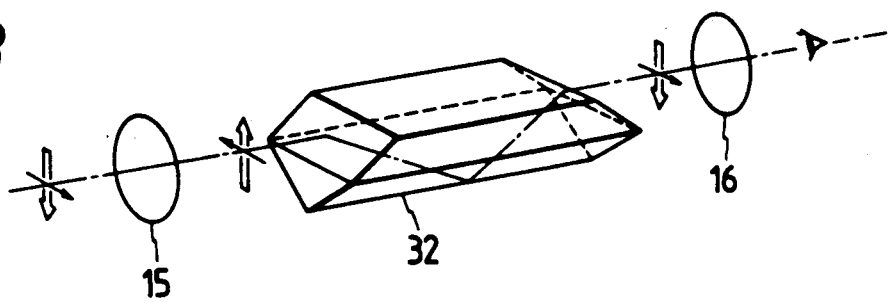
FIG. 23 is a perspective view of a finder including an image rotator making use of a Dach surface.

In regard to the plane surface portion 20f and the Fresnel lens portion 20g, their area ratio is determined according to how large amounts of light are distributed toward individual level systems. If, however, rays of angles of view required are conducted to respective eye points, it is not always necessary to provide alternately the portions. Further, if the condition of the surface of the portions is such an extent that distinctions cannot be visually made through the finder, pitches for the arrangement of the portions may arbitrarily be selected and in an extreme case, as shown in FIG. 22, only a ray traversing the upper portion of the pupil with respect to the optical axis may also be directed toward the waist-level system through a prism with a single inclined plane surface. Although, as shown in FIG. 23, an image rotator 32 is also available which makes use of a Dach prism as an example of optical elements for erecting an inverted image in addition to the Porro prism, the same purpose can be attained by constructing likewise the exit end faces even in such optical elements.

Figure 24:
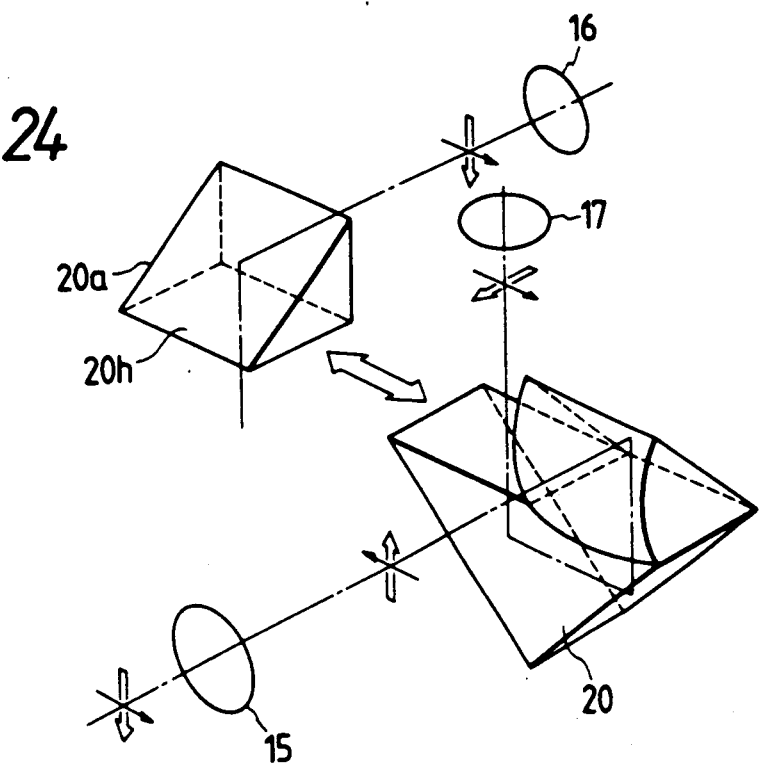
FIG. 24 is a schematic view of an eighth embodiment.

FIG. 24 diagrams an eighth embodiment, which is of type (4) and adapted to cut the Porro prism 20 with a plane surface normal to the optical axis just before a position where the fourth reflecting surface 20a of the Porro prism 20 is configured, into two pieces, so that when the finder is used as the eye-level one, a cut portion 20h is inserted into the optical path to conduct rearward the light and when it is used as the waist-level one, the cut portion 20h is removed from the optical path to direct upward the light.

Figure 25:
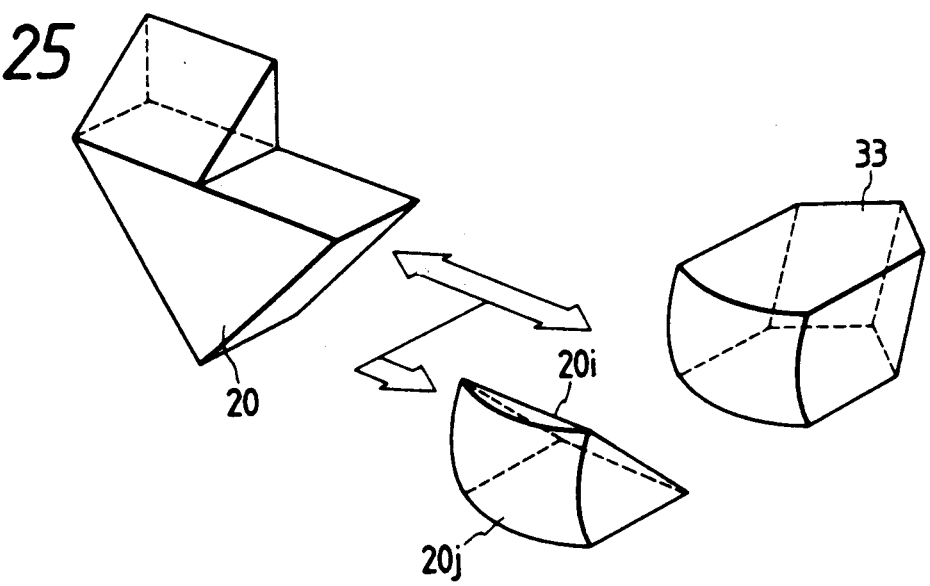
FIG. 25 is a view showing an essential part of a ninth embodiment.

FIG. 25 shows an essential part of a ninth embodiment, which is also of type (4) and adapted to cut the Porro prism 20 at a right angle to the optical axis just behind a first reflecting surface 20i of the Porro prism 20, into two pieces, so that when the finder is used as the waist-level one, a Dach prism 33 is inserted, instead of a cut portion 20j, into the optical path to conduct upward the light and when it is used as the eye-level one, the cut portion 20j is inserted to direct rearward the light.

As in the foregoing, the Porro prism 20 is cut with a section making an angle at which the total reflection is not produced with the optical axis at any position of the Porro prism 20 to insert and remove the cut portion , thereby allowing observation to be made through each of the eye- and waist level systems.

Next, a numerical data example of the finder optical system will be explained below.

Numerical data example

Figure 26:
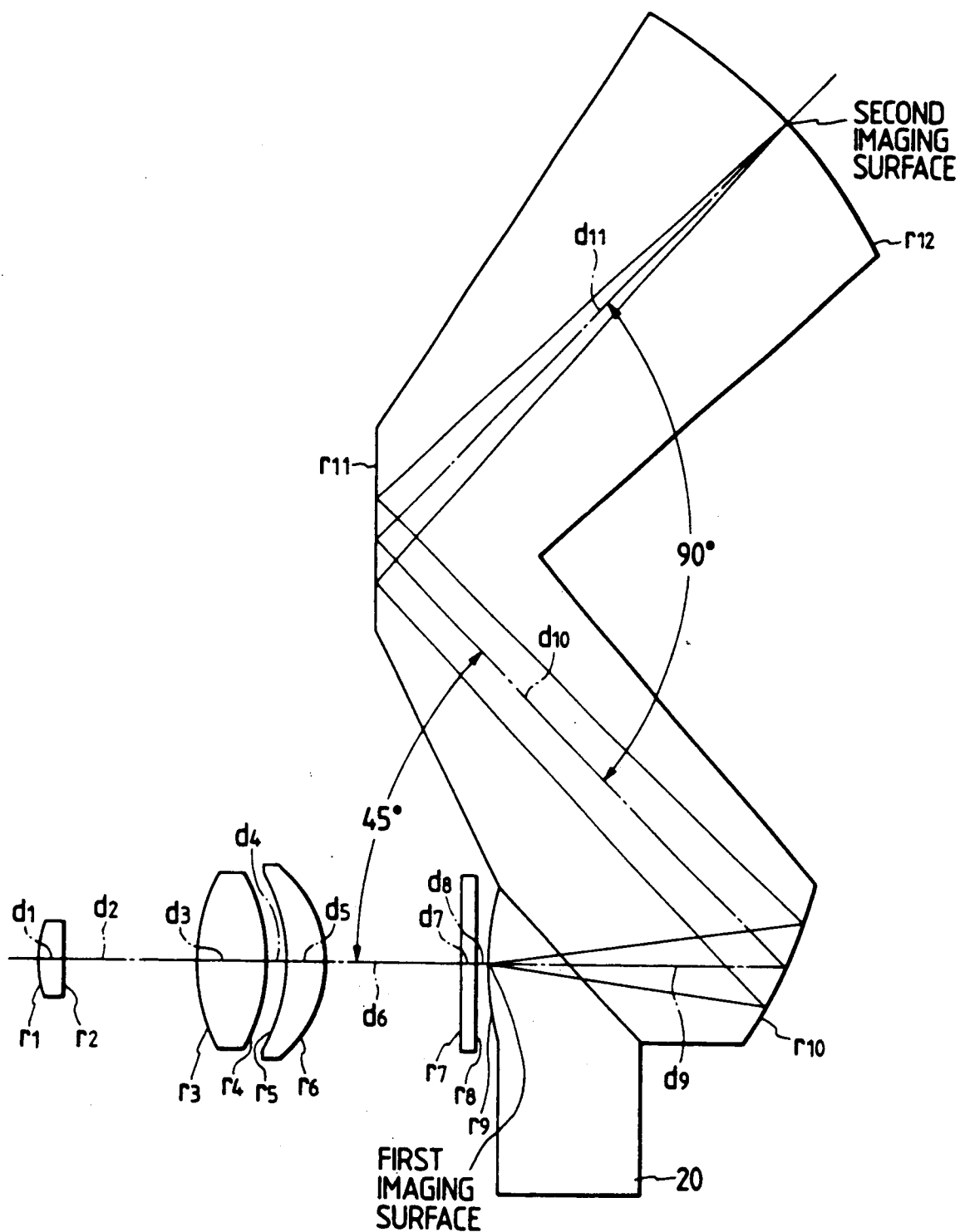
FIG. 26 is a side view of an optical system for indicating a numerical data example.

FIG. 26 shows an optical configuration including a once-imaging optical system provided behind a cemented semi-transmissive surface for reversing laterally the image in the type (the fifth embodiment) that the optical path is divided at the totally reflecting surface as shown in FIG. 20. In this case, the image formed on a first imaging surface of a top surface $r_9$ by the objective lens system of surfaces $r_1$ to $r_8$ is reformed on a second imaging surface of a top surface $r_{12}$ by a relay imaging system of surfaces $r_{10}$ and $r_{11}$. Also, the surface $r_{12}$ is configured as the field lens for conducting the light beam of a peripheral image height into the eye point diameter of the waist-level system. The surfaces $r_{10}$ and $r_{11}$ are reflecting mirror lenses. These may be replaced with the Fresnel lenses. The surface $r_{12}$ may also be configured as the Fresnel lens. The optical axis of the objective lens system is bent at an angel of 45° by the surface $r_{10}$ and further bent at 90° by the surface $r_{11}$.

Numerical data are shown in the following.

| | | | |
|---|---|---|---|
| $r_1 = 34.1382$ | | | |
| | $d_1 = 1.5122$ | $n_1 = 1.58362$ | $v_1 = 30.37$ |
| $r_2 = 14.5552$ | | | |
| | $d_2 = D_1$ | | |
| $r_3 = 12.7909$ (aspherical) | | | |
| | $d_3 = 4.3000$ | $n_2 = 1.49216$ | $v_2 = 57.50$ |
| $r_4 = -17.8960$ | | | |
| | $d_4 = D_2$ | | |
| $r_5 = -20.0266$ (aspherical) | | | |
| | $d_5 = 2.5000$ | $n_3 = 1.49216$ | $v_3 = 57.50$ |
| $r_6 = -8.1340$ | | | |
| | $d_6 = D_3$ | | |
| $r_7 = \infty$ | | | |
| | $d_7 = 1.0000$ | $n_4 = 1.52330$ | $v_4 = 0.00$ |
| $r_8 = \infty$ | | | |
| | $d_8 = 0.8500$ | | |
| $r_9 = 44.9910$ | | | |
| | $d_9 = 20.0000$ | $n_5 = 1.49216$ | $v_5 = 57.50$ |
| $r_{10} = -39.6020$ (aspherical) | | | |

-continued

|  | $d_{10} = 39.2121$ | $n_6 = 1.49216$ | $\nu_6 = 57.50$ |
|---|---|---|---|
| $r_{11} = 80.0319$ (aspherical) | | | |
| | $d_{11} = 39.2121$ | $n_7 = 1.49216$ | $\nu_7 = 57.50$ |
| $r_{12} = -29.5116$ | | | |

|  | Wide angle position | Tele angle position |
|---|---|---|
| $D_1$ | 8.797 | 0.8 |
| $D_2$ | 1.8 | 18.886 |
| $D_3$ | 9.589 | 0.5 |

Aspherical coefficients $P_3 = -13.8726,$  $E_3 = 0.69202 \times 10^{-3}$
$F_3 = -0.17258 \times 10^{-4},$  $G_3 = 0.26969 \times 10^{-6}$
$H_3 = -0.81735 \times 10^{-9},$
$P_5 = 1.0000,$  $E_5 = -0.20797 \times 10^{-3}$
$F_5 = 0.26770 \times 10^{-4},$  $G_5 = -0.82695 \times 10^{-6}$
$H_5 = -0.11928 \times 10^{-7},$
$P_{10} = 1.0000,$  $E_{10} = -0.14192 \times 10^{-4}$
$F_{10} = 0.34163 \times 10^{-6},$  $G_{10} = -0.40359 \times 10^{-8}$
$P_{11} = 1.0000,$  $E_{11} = -0.12424 \times 10^{-4}$
$F_{11} = 0.14956 \times 10^{-6},$  $G_{11} = -0.79564 \times 10^{-9},$ However, when a direction of the optical axis is taken as x and a direction perpendicular to the optical axis as S, x is given by $$x = \frac{CS^2}{1 + \sqrt{1 - PC^2 S^2}} + ES^4 + FS^6 + GS^8 + HS^{10}$$

Here, $r_1, r_2, \ldots$ represent radii of curvature of respective lens surfaces, $n_1, n_2, \ldots$ refractive indices of respective lenses, $\nu_1, \nu_2, \ldots$ Abbe's numbers of respective lenses, and Pn, En, Fn, Gn and Hn aspherical coefficients of the n-th lens surface.

What is claimed is:

1. A combined eye- and waist-level real image mode finder comprising:
   a finder objective lens provided independently of a photographic objective lens;
   an optical member for erecting a real image formed by said finder objective lens;
   a first optical element for observing the real image formed by said finder objective lens;
   a second optical element whose optical axis is inclined at a predetermined angle with respect to said first optical element, for observing the real image formed by said finder objective lens; and
   light beam splitting means arranged between said finder objective lens and said first and second optical elements, for splitting a light beam coming from said finder objective lens so that one part of the light beam is incident on said first optical element and the other part of the light beam is incident on said second optical element.

2. A finder according to claim 1, wherein said light beam splitting means comprises a first reflecting member and a second reflecting member and the light beam from said finder objective lens is incident on one of said first optical element and said second optical element by inserting selectively said first reflecting member and said second reflecting member into an optical path.

3. A finder according to claim 1, wherein said light beam splitting means is provided between an entrance surface and an exit surface of said optical member.

4. A finder according to claim 1, wherein said light beam splitting means is provided on an entrance side of said optical member.

5. A finder according to claim 1, wherein said light beam splitting means is provided on an exit side of said optical member.

6. A finder according to any one of the preceding claims, wherein said first optical element and said second optical element are comprised of eyepieces.

7. A finder according to claim 3, wherein said optical member comprises a Porro prism.

8. A finder according to claim 1, wherein said light beam splitting means transmits one part of the light beam from said finder objective lens and reflects the other part of the light beam to split the light beam into an optical path lying on a transmission side of said light beam splitting means for making said one part of the light beam incident on said first optical element and an optical path lying on a reflection side of said light beam splitting means for making said other part of the light beam incident on said second optical element.

9. A finder according to claim 8, wherein said optical member comprises a Porro prism and said light beam splitting means is constructed by cementing a half-mirror coated prism to a reflecting surface of said Porro prism.

10. A finder according to claim 9, wherein said half-mirror coated prism is a Porro prism.

11. A finder according to claims 9 or 10, wherein said half-mirror coated prism has a decentered optical element lens on an exit surface thereof.

12. A finder according to claims 9 or 10, wherein said half-mirror coated prism has a Fresnel lens surface on an exit surface thereof.

13. A finder according to claims 9 or 10, wherein said half-mirror coated prism is a triangular prism.

14. A finder according to claim 11, wherein said half-mirror coated prism is a triangular prism.

15. A finder according to claim 12, wherein said half-mirror coated prism is a triangular prism.

16. A finder according to claims 9 or 10, wherein said half-mirror coated prism is a Dach prism.

17. A finder according to claim 11, wherein said half-mirror coated prism is a Dach prism.

18. A finder according to claim 12, wherein said half-mirror coated prism is a Dach prism.

19. A finder according to claim 3, wherein said light beam splitting means comprises a transmitting portion forming an optical path lying on a transmission side thereof, directing the light beam toward said first optical element and a totally reflecting portion forming an optical path lying on a reflection side thereof, directing the light beam toward said second optical element disposed alternately in a plural each.

20. A finder according to claim 7, wherein said light beam splitting means comprises a transmitting portion forming an optical path lying on a transmission side thereof, directing the light beam toward said first optical element and a totally reflecting portion forming an optical path lying on a reflection side thereof, directing the light beam toward said second optical element disposed alternately in a plural each.

21. A finder according to claim 8, wherein a mirror is provided on the optical path lying on the transmission side of said light beam splitting means.

22. A finder according to claim 5, wherein a mirror is provided on an optical path lying on a transmission side of said light beam splitting means.

23. A finder according to claim 19, wherein a mirror is provided on an optical path lying on a transmission side of said light beam splitting means.

24. A finder according to claim 20, wherein a mirror is provided on an optical path lying on a transmission side of said light beam splitting means.

25. A finder according to claim 8, wherein a totally reflecting surface of a prism is provided on the optical path lying on the transmission side of said light beam splitting means.

26. A finder according to claim 5, wherein a totally reflecting surface of a prism is provided on an optical path lying on a transmission side of said light beam splitting means.

27. A finder according to claim 19, wherein a totally reflecting surface of a prism is provided on an optical path lying on a transmission side of said light beam splitting means.

28. A finder according to claim 20, wherein a totally reflecting surface of a prism is provided on an optical path lying on a transmission side of said light beam splitting means.

29. A finder according to any one of claims 21, 22, 24–26 or 28, wherein a reflecting Dach surface is configured on the optical path lying on the transmission side of said light beam splitting means.

30. A finder according to any one of claims 21, 22, 24–26 or 28, wherein a decentered optical element is disposed on an optical path lying on a reflection side of said light beam splitting means.

31. A finder according to claim 29, wherein a decentered optical element is disposed on an optical path lying on a reflection side of said light beam splitting means.

32. A finder according to claims 3, 4 or 5, wherein said light beam splitting means comprises a first exit surface directing the light beam toward said first optical element and a second exit surface at which an exit optical axis is inclined at a predetermined angle with regard to said first exit surface, disposed alternately.

33. A finder according to claim 1, wherein said light beam splitting means comprises a first reflecting member and the light beam from said finder objective lens is incident on one of said first optical element and said second optical element by inserting said first reflecting member into an optical path.

34. A finder according to claims 2 or 33, wherein at least one of said first reflecting member and said second reflecting member comprises a prism.

35. A finder according to claim 4, wherein said optical member comprises a Porro prism.

36. A finder according to claim 5, wherein said optical member comprises a Porro prism.

37. A finder according to claim 20, wherein a decentered lens is provided on said optical path lying on the transmission side of the light beam splitting means.

38. A finder according to claim 20, wherein a prism whose exit surface has a shape of a decentered lens is provided on said optical path lying on the transmission side of the light beam splitting means.

39. A finder according to claim 7, 35 or 36 wherein said light beam splitting means comprises a first exit surface directing the light beam toward said first optical element and a second exit surface at which an exit optical axis is inclined at a predetermined angle with regard to said first exit surface, disposed alternately.

* * * * *